United States Patent [19]

Sorbe et al.

[11] 4,430,246

[45] Feb. 7, 1984

[54] GRANULATE CONSISTING OF HYDRATED SODIUM TRIPOLYPHOSPHATE AND WATER-INSOLUBLE ALUMINO SILICATE ION EXCHANGER MATERIAL

[75] Inventors: Günter Sorbe; Horst-Dieter Wasel-Nielen, both of Hürth; Joachim Kandler, Erftstadt, all of Fed. Rep. of Germany

[73] Assignee: Hoechst Aktiengesellschaft, Knapsack, Fed. Rep. of Germany

[21] Appl. No.: 482,839

[22] Filed: Apr. 7, 1983

Related U.S. Application Data

[63] Continuation of Ser. No. 39,843, May 17, 1979, abandoned.

[30] Foreign Application Priority Data

May 22, 1978 [DE] Fed. Rep. of Germany ....... 2822231

[51] Int. Cl.[3] .......................... B01J 2/00; C11D 3/06; C11D 3/12; C11D 11/00

[52] U.S. Cl. ................................ 252/140; 23/313 R; 23/313 AS; 252/174; 252/174.16; 252/174.25; 252/179

[58] Field of Search ...................... 23/313 A, 313 AS; 252/131, 135, 140, 174, 174.16, 174.25, 179; 264/117

[56] References Cited

U.S. PATENT DOCUMENTS

| | | | |
|---|---|---|---|
| 2,977,317 | 3/1961 | Rodis | 252/135 |
| 3,501,408 | 3/1970 | Gabler | 252/135 |
| 3,538,004 | 11/1970 | Gabler | 252/135 |
| 4,096,081 | 6/1978 | Phenicie | 252/140 X |
| 4,171,277 | 10/1979 | Dankworth | 252/99 |

FOREIGN PATENT DOCUMENTS

| | | | |
|---|---|---|---|
| 2736903 | 2/1978 | Fed. Rep. of Germany | 252/140 |
| 1503356 | 3/1978 | United Kingdom | 252/140 |

*Primary Examiner*—Dennis L. Albrecht

*Attorney, Agent, or Firm*—Connolly and Hutz

[57] ABSTRACT

The invention provides a granulate comprising particles having sizes substantially within the range 0.15 to 1.25 mm, the granulate consisting of:

(a) about 1 to 99 weight % of partially or completely hydrated sodium tripolyphosphate containing water of hydration in a proportion of at least about 10 weight %, based on the theoretically possible water content, the anhydrous sodium tripolyphosphate containing about 20 to 90 weight % of phase-I-material prior to its being hydrated, the balance being phase-II, and (b) about 99 to 1 weight % of a water-insoluble alumino silicate ion exchanger material of the general formula $$(Cat_{2/n}O)_x.Me_2O_3.(SiO_2)_y.zH_2O$$

in which Cat stands for a calcium exchangeable cation with the valency n, x is 0.7 to 1.5, Me stands for boron or aluminum, y is 0.8 to 6, and z is 1.8 to 13.5.

The invention also includes a spray process for making a granulate as just specified.

The present granulate can be made with a particle size distribution which gives it particular utility as a detergent composition constituent.

3 Claims, No Drawings

GRANULATE CONSISTING OF HYDRATED SODIUM TRIPOLYPHOSPHATE AND WATER-INSOLUBLE ALUMINO SILICATE ION EXCHANGER MATERIAL

CROSS REFERENCE TO RELATED APPLICATION

This application is a continuation of application Ser. No. 039,843 filed May 17, 1979 and now abandoned.

The present invention relates to a non-dusting, readily flowable granulate consisting substantially (i.e. wholly or largely) of partially or completely hydrated sodium tripolyphosphate and a water-insoluble alumino silicate ion exchanger material, and to a process for making said granulate. As indicated below, the term "alumino silicate" includes the boron analogue, when employed herein with reference to the invention.

In German Patent Specification ("Offenlegungsschrift") No. 2 422 655, it has been proposed that water-insoluble alumino silicate ion exchange material of the general formula $$Na_z[(AlO_2)_z.(SiO_2)_y].x\ H_2O,$$

in which z and y each stand for a whole number which is at least 6 and the molar ratio of z:y is within the range 1.0 to about 0.5, and x stands for a whole number of about 15 to 264, should be used in the form of particles with a size of about 1 to 200 microns as a builder and water softening constituent of detergent compositions.

This detergent composition constituent can readily be made, for example, simply by admixing the alumino silicate ion exchange material with a blend of the other components of the detergent composition. In this process, however, use is made of extremely fine particulate alumino silicate ion exchange material, and this is liable to undergo sedimentation in the relatively coarse blend of the other detergent components, so that the resulting detergent composition is liable to exhibit a phase separation which is undesirable and disadvantageous.

A process has also been described, wherein an aqueous suspension of the ion exchanger material with the other detergent components dissolved therein is spray-dried in a tower so as to obtain a granular detergent composition. As has been found, however, only unsatisfactory quantities of material can be put through the spray nozzle structure which is commonly employed in a spray tower. To avoid this adverse effect, it has been suggested in German Patent Specification ("Offenlegungsschrift") No. 2 529 685 that at least a portion of the total quantity of ion exchanger material which has to be incorporated with the detergent composition, should be injected separately with the use of air into the spray tower while the aqueous material comprising the remainder of the ingredients is spray-dried therein. As taught in this specification, the said portion of ion exchanger material should preferably be injected at a place which is very close to the spray nozzle and at which the particles being spray-dried are still moist enough to form an agglomerate with the fine particulate ion exchanger material. Though this process is known to require quite considerable expenditure in respect of energy, it does not, in our experience, permit the production of detergent compositions which could be said to have good flow properties and a uniform particle structure, and to contain a minimum of dusty particles.

We have now found that non-dusting, ion-exchanger-containing detergent compositions which combine a remarkably uniform particle size with good flowability and storability can be made by preparing a mechanical blend of the individual detergent components. Prior to the preparation of the detergent composition, however, it is necessary to prepare a granulate comprising fine particulate ion exchanger material, anhydrous sodium tripolyphosphate and water, the granulate thereafter being mixed with a blend comprising the remainder of the detergent components. In order to obtain a granulate consisting of particles substantially uniform in size, it is an important requirement for the anhydrous sodium tripolyphosphate to contain a certain proportion of phase-I material.

According to the present invention, we provide a granulate comprising particles having sizes substantially within the range 0.15 to 1.25 mm, the granulate consisting of:

(a) about 1 to 99 weight % of partially or completely hydrated sodium tripolyphosphate containing water of hydration in a proportion of at least about 10 weight %, based on the theoretically possible water content, the anhydrous sodium tripolyphosphate containing about 20 to 90 weight % of phase-I material prior to its being hydrated, the balance being phase-II, and (b) about 99 to 1 weight % of a water-insoluble alumino silicate ion exchanger material of the general formula $$(Cat_{2/n}O)_x.Me_2O_3.(SiO_2)_y.zH_2O,$$

in which Cat stands for a calcium-exchangeable cation with the valency n, x is 0.7 to 1.5, Me stands for boron or aluminum, y is 0.8 to 6, and z is 1.8 to 13.5.

The particle size distribution in the granulate preferably corresponds to the following values (Tyler Standard Sieve Analysis Scale):

| Mesh number | Retained on sieve (weight %) |
|---|---|
| >12 | >2 |
| >16 | >5 |
| >20 | >10 |
| >35 | >50 |
| >100 | >80 |
| <100 | <10. |

A preferred feature of the present invention provides for the granulate to consist of 20 to 80 weight % of the partially or completely hydrated STPP, i.e. sodium tripolyphosphate, and 80 to 20 weight % of the alumino silicate ion exchanger material.

A further preferred feature of the present invention provides for the granulate to be made with the use of anhydrous STPP of which a proportion of up to 50 weight % is derived from wet-processed phosphoric acid, the balance thereof being derived from thermally processed phosphoric acid. Where we refer herein to thermally processed phosphoric acid, we contemplate more specifically electrothermal phosphoric acid.

On the Tyler Standard Sieve Analysis Scale, the anhydrous STPP, prior to its being hydrated, preferably presents the following particle size distribution:

| Mesh number | Retained on sieve (weight %) |
|---|---|
| >35 | >3 |
| >100 | >30. |

One of the useful alumino silicate ion exchanger materials is, for example, a type A zeolite of the formula $[Na_2O.Al_2O_3.(SiO_2)_2.4.5\ H_2O]$.

A still further preferred feature of the present invention provides for the granulate to contain additional constituents in the form of (water-soluble) surfactants and/or alkali metal salts of acid orthophosphoric acid alkyl esters having 1 to 24 carbon atoms in the alkyl group, the additional constituents being used in a total proportion of 1 to 25 weight %, based on the total weight of the granulate.

The invention also includes a process for making a granulate according to the invention, which comprises: spraying a fine mist of water, with thorough agitation, on to a pulverulent intimate blend consisting of about 1 to 99 weight % of anhydrous STPP containing about 20 to 90% of phase-I material, the balance being phase-II, and about 99 to 1 weight % of a pulverulent alumino silicate ion exchanger material, with or without chemically combined water, of the general formula $(Cat_{2/n}O)_x.Me_2O_3.(SiO_2)_y$, in which Cat, Me, x and y have the meanings given above, and granulating the blend so sprayed with water, the water being used in a total quantity sufficient to establish, in the STPP, an at least about 10 weight % content of water of hydration, and, in the alumino silicate ion exchanger material, a content of 1.8 to 13.5 mols of water, per mol of alumino silicate.

In accordance with a preferred feature of the present process, the pulverulent blend to be sprayed with water is composed of 20 to 80 weight % of the anhydrous STPP and 80 to 20 weight % of the pulverulent alumino silicate ion exchanger material. Preferably the anhydrous STPP used has the following particle size distribution (Tyler Standard Sieve Analysis Scale):

| Mesh number | Retained on sieve (weight %) |
|---|---|
| >35 | >3 |
| >100 | >30. |

Use can be made of a zeolite of the formula $[Na_2O.Al_2O_3.(SiO_2)_2]$ as the alumino silicate ion exchanger material.

A preferred feature of the present process provides for the spray water to have dissolved therein 1 to 25 weight %, based on the total weight of the blend which is to undergo granulation, of a surfactant and/or alkali metal salt of an acid orthophosphoric acid alkyl ester with 1 to 24 carbon atoms in its alkyl group. These are addends which have been found favorably to influence the granulation. In order not to reduce the power of the ion exchanger material for sequestering lime, it is good practice to use softened water as the spray water.

In practice, the process of the present invention can, for example, be carried out as follows: Anhydrous STPP and ion exchanger material are dry-blended in a free fall mixer, and the necessary quantity of water is sprayed on to the blend, within a preselected period of time, with the aid of a single-opening or two-opening nozzle, while the mixer is kept running. The water which is sprayed on to the blend causes the individual particles of the ion exchanger material and STPP, respectively, to form a stable granulate having good flow properties.

A process for making granulates consisting of STPP and sodium nitrilotriacetate has indeed been described in German Patent Specification ("Offenlegungsschrift") No. 2 021 528, wherein water is sprayed on to a dry blend of the above anhydrous components, which are kept under agitation while the water is sprayed thereonto. This process is, however, not suitable for use in granulating the blend employed in the case of the present invention for the following reason: The phosphate component in the blend would be subject to unduly rapid hydration and this would result in the granulate having unduly large particles.

A granulate can be made by the process of the present invention which has non-dusting properties. On the basis of sieve analysis data and an apparent density as disclosed herein, a granulate can readily be provided, in accordance with the invention, which will comply with the relevant requirements for its incorporation into detergent compositions by mechanically blending the dry detergent components.

The following Examples illustrate the invention, which is, however, not limited thereto. The alumino silicate ion exchanger material used in these Examples was an anhydrous type A zeolite of the formula $[Na_2O.Al_2O_3.(SiO_2)_2]$. The following average values were determined for its particle size distribution by sedimentation analysis according to Andreasen:

15 μm: 97–99%
10 μm: 94–97%
1 μm: 1–5%

This corresponded to an average diameter of the particles of 3 to 5 microns.

The phosphate components comprised anhydrous STPP's with the following average contents of phase-I material and particle size distribution.

| Content of Phase-I material in STPP (%) | Particle size distribution of STPP (Tyler Standard Sieve Analysis Scale) Mesh number | Retained on sieve (weight %) |
|---|---|---|
| 15 | >35 | 1 |
| 15 | >100 | 25 |
| 25 | >35 | 5 |
| 25 | >100 | 60 |
| 50 | >35 | 10 |
| 50 | >100 | 80 |
| 75 | >35 | 15 |
| 75 | >100 | 85 |

EXAMPLE 1: (Comparative Example)

45 kg of anhydrous STPP, which contained 10 to 20% (average value=15%) of phase-I material, was intimately blended with 45 kg of an anhydrous type A zeolite in a free fall mixer. Next, 10 kg of water was sprayed within 20 minutes, and with the aid of a two-opening nozzle, on to the blend, which was kept under agitation while the water was sprayed thereonto. The following data were determined by sieve analysis for the granulate and for the anhydrous STPP which was granulated:

| | Sieve analysis (weight %) | |
|---|---|---|
| Mesh number | STPP | Granulate |
| >12 | — | 1.3 |
| >16 | — | 2.1 |
| >20 | — | 3.2 |
| >35 | 1 | 10.1 |
| >100 | 25 | 49.6 |
| <100 | — | 49.1 |

The granulate had an apparent density of 680 g/l.

EXAMPLE 2

The procedure was as in Example 1, but anhydrous STPP which contained 20 to 30% (average value=25%) of phase-I material was used. The following data were determined by sieve analysis for the granulate and for the anhydrous STPP which was granulated:

| | Sieve analysis (weight %) | |
|---|---|---|
| Mesh number | STPP | Granulate |
| >12 | — | 3.6 |
| >16 | — | 11.0 |
| >20 | — | 19.4 |
| >35 | 5 | 65.6 |
| >65 | — | 91.7 |
| >100 | 60 | 97.5 |
| <100 | — | 2.5 |

The granulate had an apparent density of 560 g/l.

EXAMPLE 3

The procedure was as in Example 1, but anhydrous STPP which contained 40 to 60% (average value=50%) of phase-I material was used. The following data were determined by sieve analysis for the granulate and for the anhydrous STPP which was granulated:

| | Sieve analysis (weight %) | |
|---|---|---|
| Mesh number | STPP | Granulate |
| >12 | — | 12.4 |
| >16 | — | 17.5 |
| >20 | — | 25.0 |
| >35 | 10 | 86.5 |
| >65 | — | 99.0 |
| >100 | 80 | 99.6 |
| <100 | — | 0.3 |

The granulate had an apparent density of 480 g/l.

EXAMPLE 4

The procedure was as in Example 1, but anhydrous STPP which contained 70 to 80% (average value=75%) of phase-I material was used. The following data were determined by sieve analysis for the granulate and for the anhydrous STPP which was granulated:

| | Sieve analysis (weight %) | |
|---|---|---|
| Mesh number | STPP | Granulate |
| >12 | — | 13.4 |
| >16 | — | 20.5 |
| >20 | — | 29.1 |
| >35 | 15 | 90.4 |
| >65 | — | 98.9 |
| >100 | 85 | 99.8 |
| <100 | — | 0.1 |

The granulate had an apparent density of 395 g/l.

The data determined by sieve analysis for the granulates of Examples 2 to 4 show that the granulates made by the present invention contain a lower proportion of fines than the comparative granulate of Example 1. The granulates according to the present invention had a good storability and flowability, and could readily be incorporated into detergent compositions.

We claim:

1. In a granulate comprising particles having sizes substantially within the range 0.15 to 1.25 mm, the granulate consisting essentially of:

(a) about 1 to 99 weight % of partially or completely hydrated sodium tripolyphosphate containing water of hydration in a proportion of at least about 10 weight %, based on the theoretically possible water content and having been made from the anhydrous sodium tripolyphosphate, and (b) about 99 to 1 weight % of a water-insoluble alumino silicate ion exchanger material of the general formula $$(Cat_{2/n}O)_x.Me_2O_3.(SiO_2)_y.z\ H_2O$$

in which Cat stands for a calcium exchangeable cation with the valency n, x is 0.7 to 1.5, Me stands for Aluminium, y is 0.8 to 6, and z is 1.8 to 13.5 the improvement wherein the anhydrous sodium tripolyphosphate contains about 20 to 80 weight % of phase-I material prior to hydration and the balance being phase-II;

the alumino silicate ion exchanger material being a type A zeolite of the formula $[Na_2O.Al_2O_3.(SiO_2)_2.4.5\ H_2O]$, the material being anhydrous and having the following particle size distribution according to Andreasen prior to granulation:

15 μm: 97–99%

10 μm: 94–97%

1 μm: 1–5% corresponding to an average diameter of the particles of 3 to 5 microns;

and the granulate presenting the following particle size distribution (Tyler Standart Sieve Analysis Scale)

| Mesh number | Retained on sieve, weight % |
|---|---|
| >12 | 3.6–13.4 |
| >16 | 11.0–20.5 |
| >20 | 19.4–29.1 |
| >35 | 65.6–90.4 |
| >65 | 91.7–98.9 |
| >100 | 97.5–99.8 |
| <100 | 2.5– 0.1 |

2. Granulate as claimed in claim 1 wherein the anhydrous sodium tripolyphosphate, prior to its being hydrated, presents the following particle size distribution (Tyler Standard Analysis Scale):

| Mesh number | Retained on sieve (weight %) |
|---|---|
| >35 | >3 |
| >100 | >30 |

3. Granulate as claimed in claim 1 containing as additional constituents 1 to 25 weight % of a surfactant and/or an alkali metal salt of an acid orthophosphoric acid alkyl ester with 1 to 24 carbon atoms in its alkyl group, the percentage being based on the total weight of the granulate.

* * * * *